United States Patent
Boyle et al.

(10) Patent No.: US 8,341,339 B1
(45) Date of Patent: Dec. 25, 2012

(54) HYBRID DRIVE GARBAGE COLLECTING A NON-VOLATILE SEMICONDUCTOR MEMORY BY MIGRATING VALID DATA TO A DISK

(75) Inventors: William B. Boyle, Lake Forest, CA (US); Alan T. Meyer, Anaheim Hills, CA (US); Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 382 days.

(21) Appl. No.: 12/814,662

(22) Filed: Jun. 14, 2010

(51) Int. Cl.
*G06F 12/00* (2006.01)

(52) U.S. Cl. ........................................ 711/103; 711/112

(58) Field of Classification Search ........................ None
See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 6,044,439 A | 3/2000 | Ballard et al. | |
| 6,115,200 A | 9/2000 | Allen et al. | |
| 6,275,949 B1 | 8/2001 | Watanabe | |
| 6,429,990 B2 | 8/2002 | Serrano et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,754,021 B2 | 6/2004 | Kisaka et al. | |
| 6,807,630 B2 | 10/2004 | Lay et al. | |
| 6,909,574 B2 | 6/2005 | Aikawa et al. | |
| 6,968,450 B1 | 11/2005 | Rothberg et al. | |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,142,385 B2 | 11/2006 | Shimotono et al. | |
| 7,334,082 B2 | 2/2008 | Grover et al. | |
| 7,395,452 B2 | 7/2008 | Nicholson et al. | |
| 7,411,757 B2 | 8/2008 | Chu et al. | |
| 7,461,202 B2 | 12/2008 | Forrer, Jr. et al. | |
| 7,472,222 B2 | 12/2008 | Auerbach et al. | |
| 7,477,477 B2 | 1/2009 | Maruchi et al. | |
| 7,509,471 B2 | 3/2009 | Gorobets | |
| 7,516,346 B2 | 4/2009 | Pinheiro et al. | |
| 7,610,438 B2 | 10/2009 | Lee et al. | |
| 7,613,876 B2 | 11/2009 | Bruce et al. | |
| 7,644,231 B2 | 1/2010 | Recio et al. | |
| 7,685,360 B1 | 3/2010 | Brunnett et al. | |
| 7,752,491 B1 | 7/2010 | Liikanen et al. | |
| 2006/0195657 A1 | 8/2006 | Tien et al. | |
| 2008/0040537 A1 | 2/2008 | Kim | |
| 2008/0059694 A1 | 3/2008 | Lee | |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Brian Peugh (57) ABSTRACT

A hybrid drive is disclosed comprising a non-volatile semiconductor memory (NVSM) comprising a plurality of blocks, and a head actuated over a disk comprising a plurality of tracks, each track comprising a plurality of data sectors. A garbage collection operation is executed on the NVSM by reading valid data from a first block of the NVSM, writing the valid data to the disk, and erasing the first block.

18 Claims, 6 Drawing Sheets

U.S. PATENT DOCUMENTS

| | | |
|---|---|---|
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0307270 A1 | 12/2008 | Li |
| 2009/0019218 A1 | 1/2009 | Sinclair et al. |
| 2009/0031072 A1 | 1/2009 | Sartore |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0249168 A1 | 10/2009 | Inoue |
| 2009/0271562 A1 | 10/2009 | Sinclair |
| 2009/0327603 A1 | 12/2009 | Mckean et al. |
| 2010/0088459 A1 | 4/2010 | Arya et al. |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

HYBRID DRIVE GARBAGE COLLECTING A NON-VOLATILE SEMICONDUCTOR MEMORY BY MIGRATING VALID DATA TO A DISK

BACKGROUND

A non-volatile semiconductor memory may be employed as mass storage for a computer system (e.g., desktop, laptop, portable, etc.) or a consumer device (e.g., music player, cell phone, camera, etc.) or other suitable application. The non-volatile semiconductor memory may comprise one or more memory devices (such as a flash memory) and control circuitry for accessing each memory device. Each memory device is coupled to an I/O bus, as well as a number of interface control lines. When issuing a program command or an erase command to a memory device, the control circuitry transfers the address and command data (and write data for a program operation) over the I/O bus. When issuing a read command, the control circuitry transfers the address and command data over the I/O bus and then receives the read data over the I/O bus.

Each memory device typically comprises a number of blocks which are accessed a page at a time. For example, a single block may comprise 128 pages where each page comprises 4096 bytes. Since a page typically cannot be overwritten without first being erased, a new page in a different block is typically selected to perform an "overwrite" operation. Accordingly, the address translation layer must maintain the appropriate logical address to physical address mapping as each write operation changes the physical location of the user data. When a page is "overwritten" by writing the same LBA to a new page of a new block, the old page in the old block is invalidated which can result in old blocks storing valid as well as invalid pages. Periodically, a garbage collection operation is executed to relocate valid pages of a first block to a second block so that first block can be erased and reused.

DETAILED DESCRIPTION OF EMBODIMENTS OF THE INVENTION

Figure 1A:
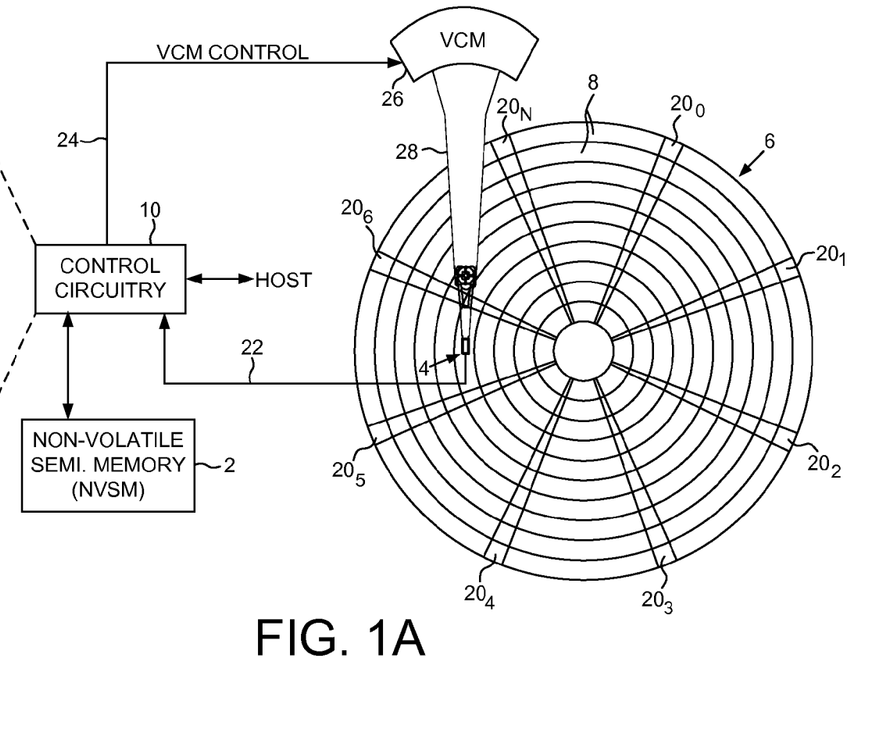
FIG. 1A shows a hybrid drive according to an embodiment of the present invention comprising a non-volatile semiconductor memory (NVSM), a head actuated over a disk, and control circuitry.
Figure 1B:
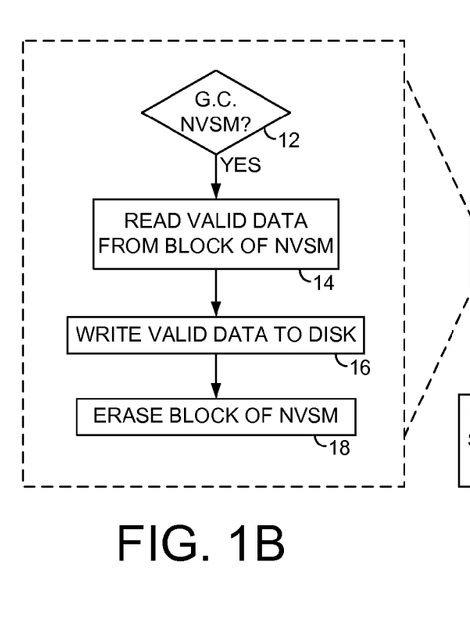
FIG. 1B is a flow diagram executed by the control circuitry according to an embodiment of the present invention wherein valid data read from a block of the NVSM is migrated to the disk.

FIG. 1A shows a hybrid drive according to an embodiment of the present invention comprising a non-volatile semiconductor memory (NVSM) 2 comprising a plurality of blocks, and a head 4 actuated over a disk 6 comprising a plurality of tracks 8, each track comprising a plurality of data sectors. The hybrid drive further comprises control circuitry 10 for executing the flow diagram of FIG. 1B to perform a garbage collection operation on the NVSM 2 (step 12) by reading valid data from a first block of the NVSM (step 14), writing the valid data to the disk (step 16), and erasing the first block (step 18).

In the embodiment of FIG. 1A, the disk 6 comprises embedded servo sectors $20_0$-$20_N$ that defines the tracks 8. The control circuitry 10 processes a read signal 22 emanating from the head 4 to demodulate the servo sectors $20_0$-$20_N$ and generate a position error signal (PES) representing an error between the actual position of the head and a target position relative to a target track. The control circuitry 10 filters the PES using a suitable compensation filter to generate a control signal 24 applied to a voice coil motor (VCM) 26 which rotates an actuator arm 28 about a pivot in order to actuate the head 4 radially over the disk in a direction that reduces the PES.

In one embodiment, each track 8 comprises a plurality of data sectors that may be accessed using any suitable addressing scheme. In one embodiment, a conventional static addressing scheme is employed wherein each LBA is pre-mapped to a physical block address (PBA) assigned to one of the data sectors. In an alternative embodiment, dynamic addressing may be employed wherein an LBA of a write command is dynamically mapped to a PBA assigned to a data sector of a track at the time of the write operation. The dynamic LBA to PBA mapping occurs during each write operation (including overwrites) such that the LBA to PBA mapping changes over time. Dynamic addressing differs from static addressing wherein an essentially static mapping of LBAs to PBAs is predefined (except an LBA may be remapped to the PBA of a spare data sector in the event of a grown defect). When an LBA is overwritten using static addressing, the new data overwrites the same PBA, whereas with dynamic addressing the new data is written to a new PBA.

Figure 2A:
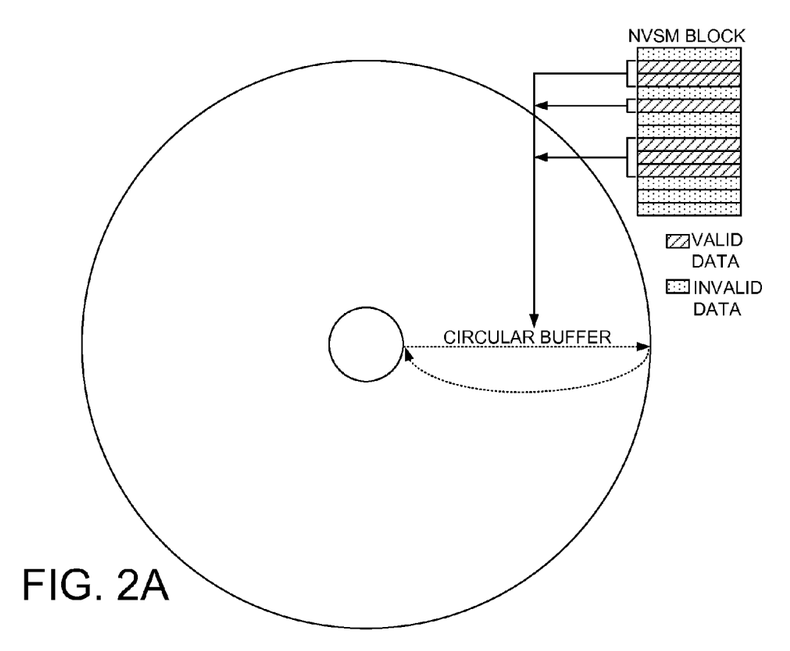
FIG. 2A shows an embodiment of the present invention wherein dynamic mapping is implemented with a circular buffer on the disk.

FIG. 2A shows an embodiment of the present invention wherein dynamic addressing in an embodiment of the present invention is implemented by defining at least one circular buffer on the disk, wherein write data of write commands is written to a head of the circular buffer. When garbage collecting a block of the NVSM, valid data read from a block may be written to the head of the circular buffer on the disk (rather than writing the valid data to a different block within the NVSM as is typically done in the prior art). In one embodiment, the tracks are written in a shingled manner such that a previously written track is partially overwritten. Writing data in one direction (always at the head of the circular buffer) ensures that a previously written track is partially overwritten only on one side. Other embodiments may implement a circular buffer on the disk without shingled writing. The technique of writing data to a disk in a circular buffer is generally referred to as a log structured write regardless as to whether shingled writing is employed.

If the head 4 is already located at the head of the circular buffer, the garbage collection operation of the NVSM blocks can be executed without seeking the head 4 around the disk 6 as would be required if the disk were accessed with static addressing. In addition, the garbage collection of the NVSM blocks can be executed while simultaneously servicing host commands without seeking the head 4 away from the head of the circular buffer unless there is a cache miss read command. That is, host write commands can be serviced by the NVSM (e.g., by interleaving the write commands with garbage collection read commands), and host read commands can also be serviced by the NVSM as long as the data is "cached" in the NVSM. If a host read command cannot be serviced by the NVSM (cache miss), the garbage collection operation of the NVSM may be interrupted while the head 4 seeks to the track on the disk for servicing the host read command.

Figure 2B:
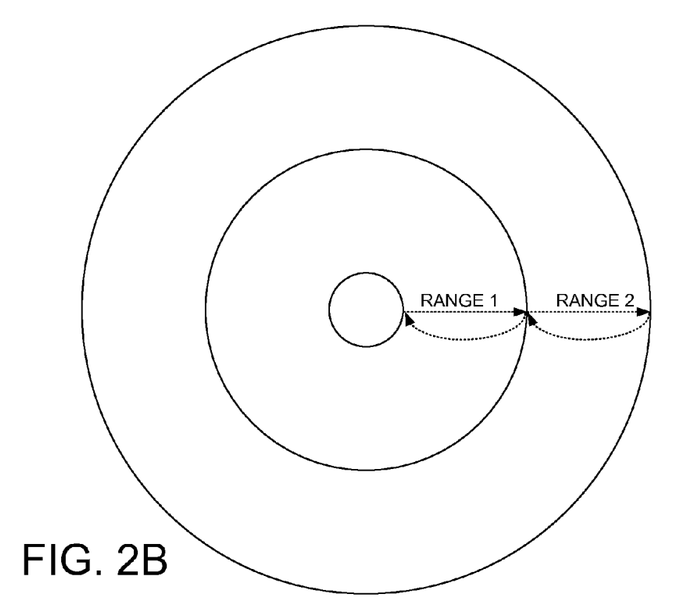
FIG. 2B shows an embodiment of the present invention wherein multiple circular buffers are defined on the disk.
Figure 2C:
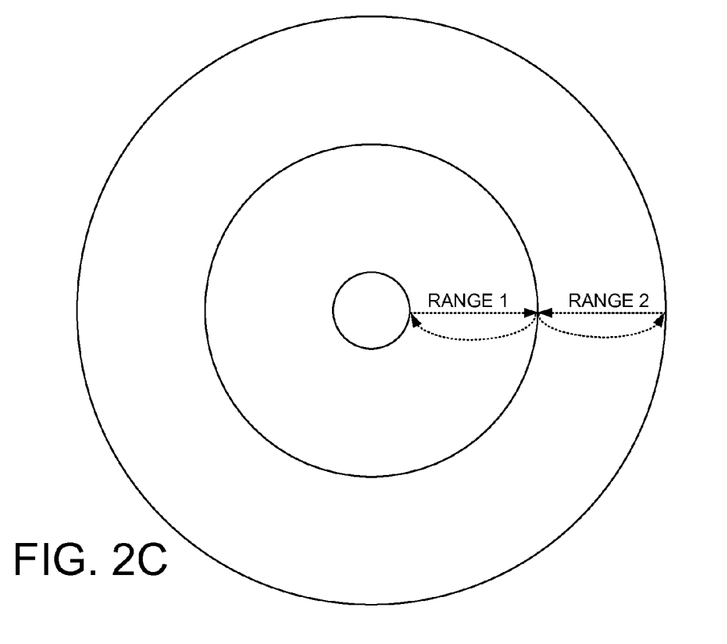
FIG. 2C shows an embodiment of the present invention wherein each circular buffer is accessed according to a range of logical block addresses (LBAs).

FIG. 2B shows an embodiment of the present invention wherein a plurality of circular buffers are defined on the disk, including a first circular buffer written from an inner diameter of the disk toward a middle diameter, and a second circular buffer written from the middle diameter toward an outer diameter of the disk. Other embodiments may write in the opposite direction (from the outer diameter toward the inner diameter), and in an embodiment shown in FIG. 2C, the first and second circular buffers may both be written toward the middle diameter to compensate for a performance loss that may occur due to the skew angle of the head 4.

Figure 2D:
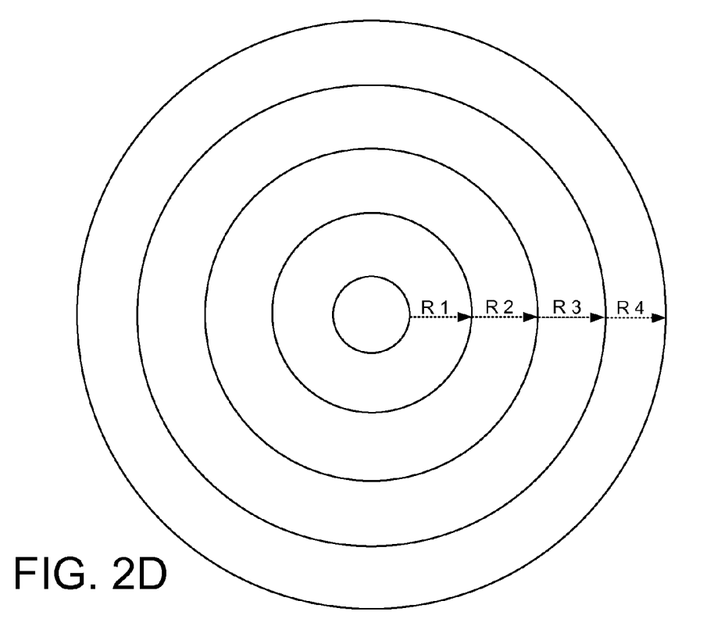
FIG. 2D shows an embodiment of the present invention wherein the disk comprises a number of circular buffers each accessed according to an LBA range.

In one embodiment, each circular buffer in FIG. 2B is assigned a range of LBAs and the corresponding circular buffer selected to service write commands having the corresponding LBAs, including write commands generated when garbage collecting valid data in the NVSM. That is, the LBAs of a write command are evaluated to select the corresponding circular buffer, and then the write data is written to the head of the selected circular buffer using dynamic addressing. FIG. 2D shows an embodiment of the present invention wherein the disk comprises a number of circular buffers each assigned an LBA range. Segregating the write data into different circular buffers based on the LBA range may help reduce the fragmentation of each circular buffer, as well as reduce the seek distance when accessing the disk since LBAs are typically accessed within a particular range (e.g., an LBA range corresponding to one or more system, application, or user data files).

In one embodiment, in order to avoid seeking between the circular buffers while garbage collecting the NVSM, the valid data in the blocks of the NVSM are garbage collected based on the LBA ranges. For example, the valid data in blocks of the NVSM corresponding to a first circular buffer are garbage collected first so that the head need not seek away from the first circular buffer (except to service "cache miss" host read commands). After garbage collecting the valid data in the blocks of the NVSM corresponding to the LBA range for the first circular buffer, the valid data in the blocks of the NVSM corresponding to the LBA range of a second circular buffer are garbage collected, and so on. In one embodiment, one or more blocks may store valid data having LBAs that span two or more of the circular buffers, in which case the valid data corresponding to a first LBA range are migrated to the first circular buffer, then the valid data corresponding to a second LBA range are migrated to a second circular buffer, and so on. Each block is then erased after all the valid data of the block has been migrated to the disk (or to a new block on the NVSM). In alternative embodiment described below with reference to FIG. 3, each block of the NVSM stores data based on an LBA range so that the valid data of each block will correspond to only one of the circular buffers on the disk. In this embodiment, the blocks corresponding to an LBA range may be erased after migrating all the valid data to the corresponding circular buffer.

Figure 3:
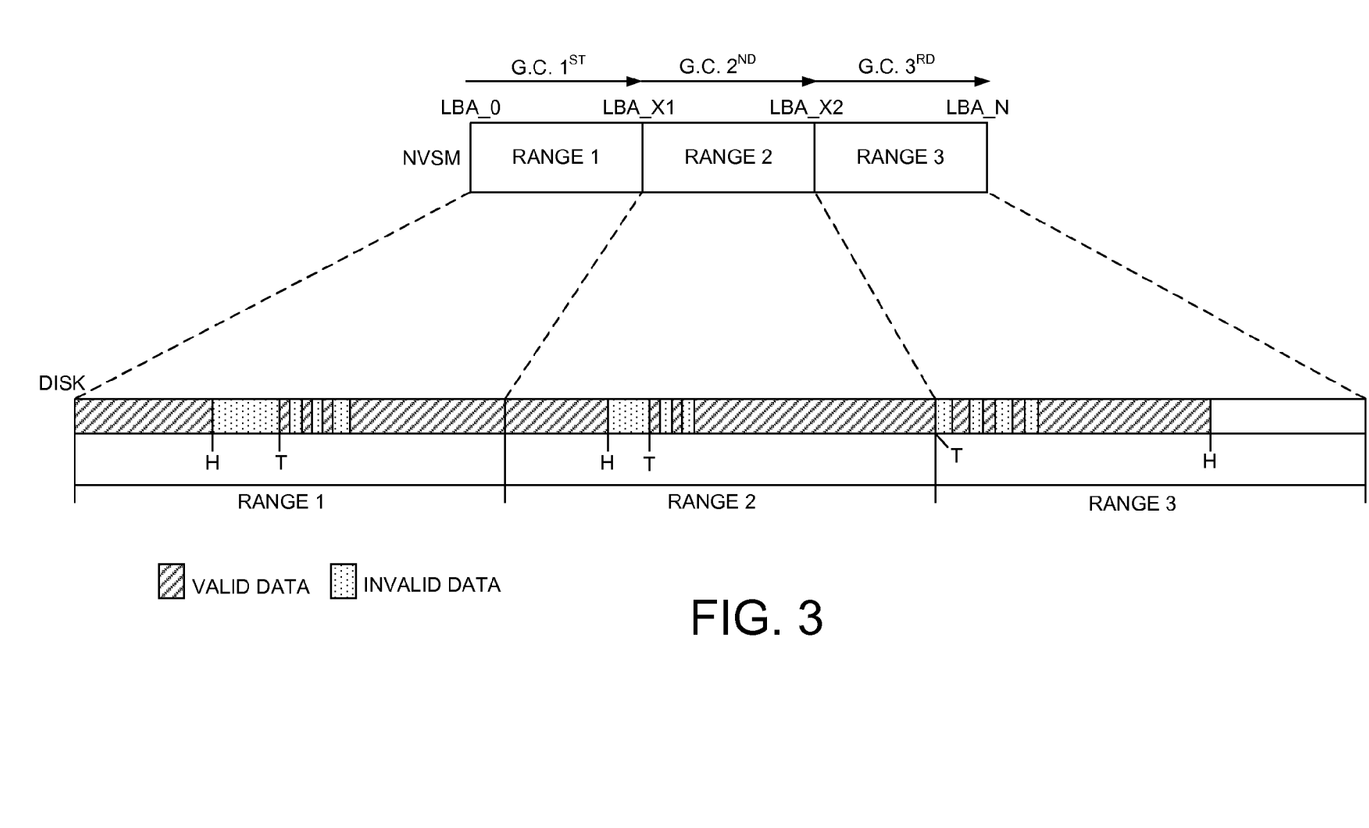
FIG. 3 shows an embodiment of the present invention wherein data is written to a block of the NVSM based on the LBA of the write command, and valid data migrated to a corresponding circular buffer assigned to the corresponding LBA range.

FIG. 3 shows an embodiment of the present invention wherein during write operations host data is written to the blocks of the NVSM based on an LBA assigned to the host data. In one embodiment, a number of LBA ranges are defined for the NVSM and then free blocks are allocated to each LBA range as needed. In the example shown in FIG. 3, three LBA ranges are defined for the NVSM wherein write data is stored in the NVSM based on the LBAs of the write commands. When garbage collecting the blocks, the valid data of a block in a particular LBA range is written to a corresponding LBA range defined on the disk (e.g., written to a corresponding circular buffer as shown in FIG. 3). In one embodiment, the blocks of NVSM are garbage collected in an order based on the LBA ranges; that is, all of the blocks in each LBA range are garbage collected before moving on to the next LBA range to avoid seeking the head to different LBA ranges on the disk. In the example shown in FIG. 3, the first LBA range is garbage collected, and then the second LBA range, and then the third LBA range (or in any other suitable order).

In the embodiment of FIG. 3, for each LBA range defined for the NVSM there is a corresponding LBA range defined on the disk. In another embodiment, the number of LBA ranges defined for the NVSM may be greater than the number of LBA ranges defined on the disk such that multiple of the NVSM LBA ranges may be mapped to a single LBA range on the disk. In one embodiment, the LBA ranges defined for the NVSM may be non-contiguous, and in an embodiment disclosed below, the LBA ranges cover data that are most appropriately stored in the NVSM (e.g., data frequently accessed with a low write/read ratio). The remaining LBA ranges not covered by the NVSM are covered by the disk using one or more dynamically mapped segments (e.g., one or more circular buffers). In one embodiment, a dynamically mapped segment on the disk may cover one or more LBA ranges defined for the NVSM as well as additional LBA ranges not covered by the NVSM.

Figure 4A:
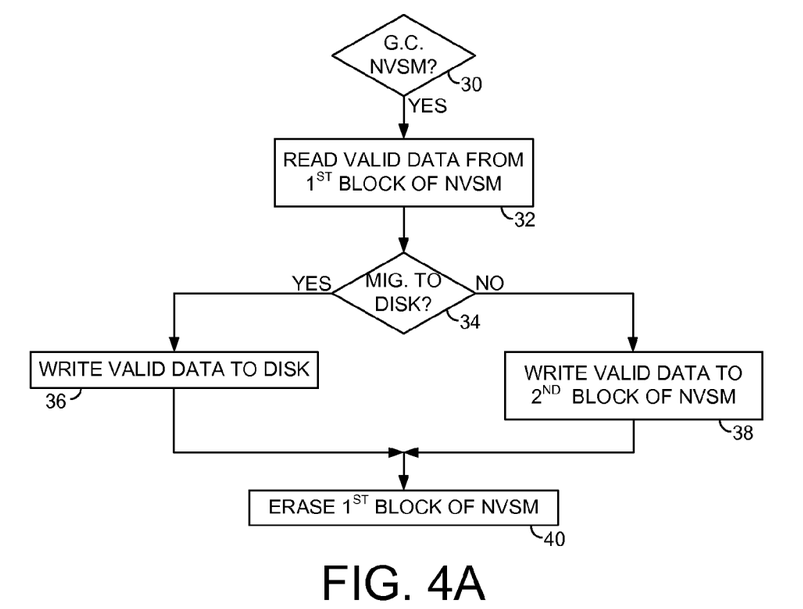
FIG. 4A is a flow diagram according to an embodiment of the present invention wherein valid data from a block of the NVSM may be written to the disk or to a new block of the NVSM during garbage collection.

FIG. 4A is a flow diagram according to an embodiment of the present invention wherein when a garbage collection operation is executed on the NVSM (step 30), valid data is read from a first block of the NVSM (step 32) and a determination is made as to whether the valid data should be migrated to the disk (step 34). If so, the valid data is written to the disk as described above (step 36). Otherwise, the valid data is written to a second block of the NVSM (step 38). After relocating the valid data, the first block is erased (step 40).

Figure 4B:
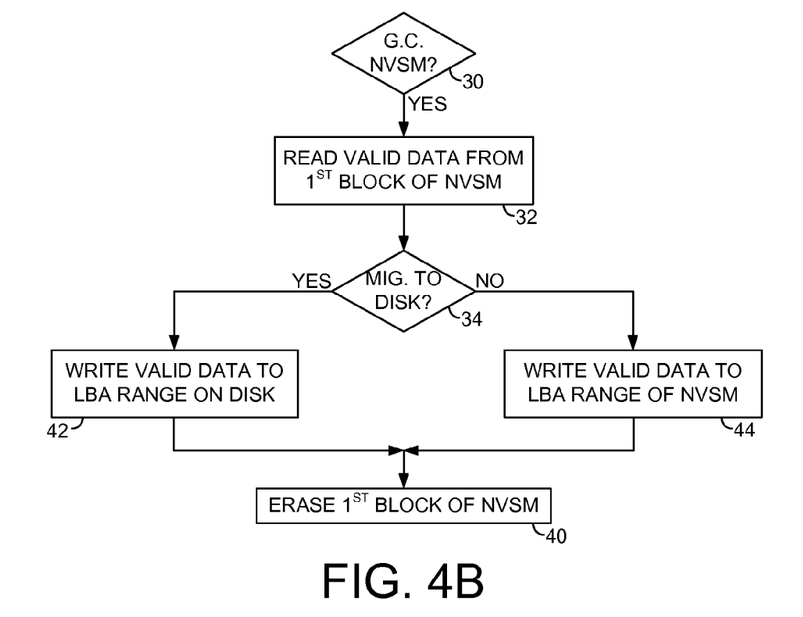
FIG. 4B is a flow diagram according to an embodiment of the present invention wherein valid data from a block of the NVSM may be written to the disk or to a new block of the NVSM based on the LBA of the valid data.

FIG. 4B is a flow diagram according to an embodiment of the present invention wherein when the valid data of a first block is migrated to the disk (step 34), the valid data is written to a segment of the disk having an LBA range corresponding to the LBAs of the valid data (step 42). Otherwise the valid data is written to a second block of the NVSM in an LBA range corresponding to the LBAs of the valid data (step 44).

Valid data may be migrated to the disk during the garbage collection operation as part of a migration policy. For example, in one embodiment any valid data identified during garbage collection may be considered "cold" since it has not been recently overwritten. Therefore in one embodiment when garbage collecting the NVSM, the valid data is migrated to the disk rather than written to a new block within the NVSM as described above. In other embodiments described below, additional parameters may be considered as part of the migration policy to determine whether to migrate valid data to the disk or retain the valid data in the NVSM.

Figure 5A:
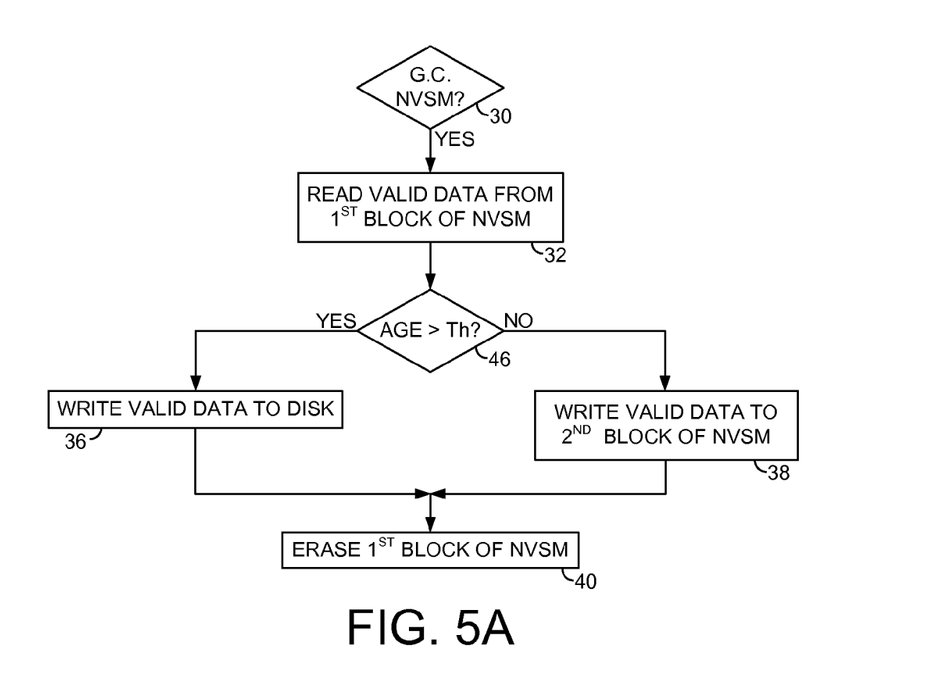
FIG. 5A is a flow diagram according to an embodiment of the present invention wherein valid data is written to the disk if an age of the valid data exceeds a threshold, otherwise the valid data is written to a new block of the NVSM.

FIG. 5A is a flow diagram according to an embodiment of the present invention wherein whether to migrate the valid data from a first block of the NVSM to the disk is based on an age of the valid data. If the age of the valid data exceeds a threshold (step 46), then the valid data is written to the disk (step 36). Otherwise, the valid data is written to a second block of the NVSM (step 38). In this embodiment, the age of the valid data will exceed the threshold (step 46) if the valid data is not overwritten for an extended period of time. In one embodiment, the age of the valid data is determined relative to use of the hybrid drive (e.g., relative to a number of access commands serviced by the hybrid drive). That is, the age of the valid data may be calculated as the number of access commands serviced by the hybrid drive after writing the valid data to the NVSM.

Figure 5B:
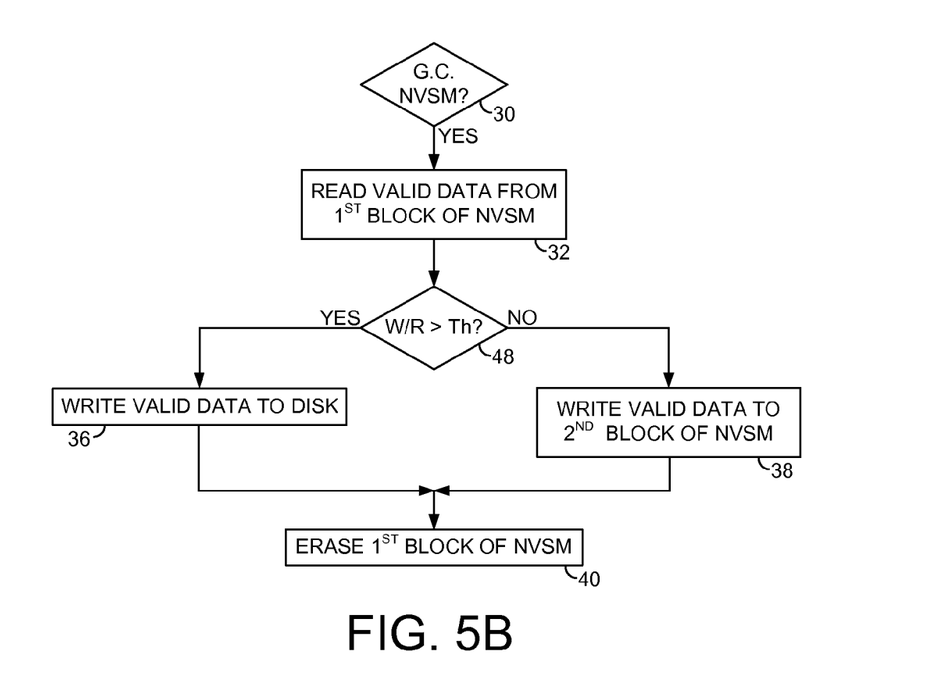
FIG. 5B is a flow diagram according to an embodiment of the present invention wherein valid data is written to the disk if a write/read ratio exceeds a threshold, otherwise the valid data is written to a new block of the NVSM.

FIG. 5B is a flow diagram according to an embodiment of the present invention wherein whether to migrate the valid data from a first block of the NVSM to the disk is based on a write/read ratio of the corresponding LBA. If the write/read ratio of the valid data exceeds a threshold (step 48), then the valid data is written to the disk (step 36). Otherwise, the valid data is written to a second block of the NVSM (step 38). In this embodiment, if an LBA is written more frequently than it is read (write/read ratio greater than threshold), it may improve the longevity of the hybrid drive by storing the corresponding data on the disk in order to reduce write amplification of the NVSM. In one embodiment, the write/read ratio is biased by the frequency of access such that less frequently accessed LBAs are migrated to the disk and more frequently accessed LBAs remain in the NVSM.

In the embodiments described above, the garbage collection operation consolidates memory in the NVSM by relocating valid data in fragmented blocks either to the disk or to a new block within the NVSM so that the fragmented blocks can be erased and reused. In another embodiment of the present invention, the garbage collection operation may be performed as part of a wear leveling algorithm which attempts to spread out write operations evenly over the blocks. During the wear leveling algorithm, an entire block (comprising only valid data) may be relocated to the disk or to a new block in the NVSM (based on the migration policy) so that the old block can be erased and reused.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A hybrid drive comprising:
a non-volatile semiconductor memory (NVSM) comprising a plurality of blocks;
a disk comprising a plurality of tracks, each track comprising a plurality of data sectors;
a head actuated over the disk;
control circuitry operable to execute a garbage collection operation on the NVSM by:
reading valid data from a first block of the NVSM;
writing the valid data to the disk; and
erasing the first block.

2. The hybrid drive as recited in claim 1, wherein the control circuitry is further operable to write the valid data to the disk using dynamic addressing.

3. The hybrid drive as recited in claim 2, wherein the control circuitry is further operable to execute the garbage collection operation on the NVSM by:
defining a first circular buffer on the disk comprising a plurality of the tracks; and
writing the valid data to a head of the first circular buffer.

4. The hybrid drive as recited in claim 3, wherein the control circuitry is further operable to execute the garbage collection operation by:
defining a second circular buffer on the disk comprising a plurality of the tracks;
assigning a first range of logical block addresses (LBAs) to the first circular buffer;
assigning a second range of LBAs to the second circular buffer; and
writing the valid data to one of the first and second circular buffers based on an LBA assigned to the valid data.

5. The hybrid drive as recited in claim 4, wherein the control circuitry is further operable to execute the garbage collection operation on a plurality of blocks in the NVSM in an order based on the LBAs of valid data stored in the blocks.

6. The hybrid drive as recited in claim 4, wherein the control circuitry is further operable to write host data to the first block of the NVSM based on an LBA assigned to the host data.

7. The hybrid drive as recited in claim 1, wherein the control circuitry is further operable to execute the garbage collection operation by:
determining whether to migrate the valid data to the disk; and
when the valid data should remain in the NVSM, writing the valid data to a second block of the NVSM.

8. The hybrid drive as recited in claim 7, wherein the control circuitry is further operable to determine to migrate the valid data to the disk when an age of the valid data exceeds a threshold.

9. The hybrid drive as recited in claim 7, wherein the control circuitry is further operable to determine to migrate the valid data to the disk when a write/read ratio of the valid data exceeds a threshold.

10. A method of operating a hybrid drive, the hybrid drive comprising a non-volatile semiconductor memory (NVSM) comprising a plurality of blocks, a disk comprising a plurality of tracks, each track comprising a plurality of data sectors, and a head actuated over the disk, the method comprising executing a garbage collection operation on the NVSM by:
    reading valid data from a first block of the NVSM;
    writing the valid data to the disk; and
    erasing the first block.

11. The method as recited in claim 10, further comprising writing the valid data to the disk using dynamic addressing.

12. The method as recited in claim 11, further comprising:
    defining a first circular buffer on the disk comprising a plurality of the tracks; and
    writing the valid data to a head of the first circular buffer.

13. The method as recited in claim 12, further comprising:
    defining a second circular buffer on the disk comprising a plurality of the tracks;
    assigning a first range of logical block addresses (LBAs) to the first circular buffer;
    assigning a second range of LBAs to the second circular buffer; and
    writing the valid data to one of the first and second circular buffers based on an LBA assigned to the valid data.

14. The method as recited in claim 13, further comprising executing the garbage collection operation on a plurality of blocks in the NVSM in an order based on the LBAs of valid data stored in the blocks.

15. The method as recited in claim 13, further comprising writing host data to the first block of the NVSM based on an LBA assigned to the host data.

16. The method as recited in claim 10, further comprising:
    determining whether to migrate the valid data to the disk; and
    when the valid data should remain in the NVSM, writing the valid data to a second block of the NVSM.

17. The method as recited in claim 16, further comprising determining to migrate the valid data to the disk when an age of the valid data exceeds a threshold.

18. The method as recited in claim 16, further comprising determining to migrate the valid data to the disk when a write/read ratio of the valid data exceeds a threshold.

* * * * *